US009232404B2

United States Patent
Chen et al.

(10) Patent No.: US 9,232,404 B2
(45) Date of Patent: Jan. 5, 2016

(54) METHOD, APPARATUS, AND SYSTEM FOR DATA TRANSMISSION

(75) Inventors: Jing Chen, Shanghai (CN); Ke Wang, Shanghai (CN); Hui Ma, Beijing (CN); Bo Lin, Beijing (CN); Aiqing Zhang, Shanghai (CN); Dongmei Zhang, Bejing (CN); Xiaoyu Bi, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 180 days.

(21) Appl. No.: 13/432,504

(22) Filed: Mar. 28, 2012

(65) Prior Publication Data

US 2012/0182929 A1  Jul. 19, 2012

Related U.S. Application Data

(63) Continuation of application No. PCT/CN2010/077342, filed on Sep. 27, 2010.

(30) Foreign Application Priority Data

Sep. 28, 2009 (CN) .......................... 2009 1 0093753
Feb. 3, 2010 (CN) .......................... 2010 1 0105867

(51) Int. Cl.
*H04L 12/26* (2006.01)
*H04B 7/14* (2006.01)
(Continued)

(52) U.S. Cl.
CPC ........... *H04W 12/10* (2013.01); *H04L 63/1458* (2013.01); *H04W 12/02* (2013.01); *H04W 12/12* (2013.01); *H04W 84/047* (2013.01)

(58) Field of Classification Search
CPC ... H04W 12/02; H04W 84/047; H04W 12/12; H04W 12/10; H04L 63/1458
USPC ......... 370/465, 315, 312, 328, 394, 236, 252, 370/329, 349, 469; 455/422, 450, 458
See application file for complete search history.

(56) References Cited

U.S. PATENT DOCUMENTS 6,118,775 A    9/2000  Kari et al.
2005/0243798 A1  11/2005  Dunn et al.
(Continued)

FOREIGN PATENT DOCUMENTS

CN    1997204     7/2007
CN    101001252 A  7/2007
(Continued)

OTHER PUBLICATIONS

International Search Report and Written Opinion of the International Searching Authority issued in corresponding PCT Patent Application No. PCT/CN2010/077342, mailed Dec. 30, 2010.
(Continued)

*Primary Examiner* — Alpus H Hsu
*Assistant Examiner* — Camquyen Thai
(74) *Attorney, Agent, or Firm* — Brinks Gilson & Lione

(57) ABSTRACT

Embodiments of the present invention disclose a method, an apparatus, and a system for data transmission. The method for data transmission includes: determining that data to be transmitted is control plane signaling related to a user equipment that camps on a relay node; and transmitting the data through a first user data bearer established between the relay node and a donor base station, where the first user data bearer provides integrity protection for the data. According to the embodiments of the present invention, when the control plane signaling related to the user equipment that camps on the relay node is transmitted between the relay node and the donor base station, integrity protection is provided for the control plane signaling, and therefore attacks such as the denial of a service attack are prevented.

14 Claims, 9 Drawing Sheets

(51) Int. Cl.

| | | |
|---|---|---|
| *H04W 4/00* | (2009.01) | |
| *H04J 3/24* | (2006.01) | |
| *H04J 3/16* | (2006.01) | |
| *H04W 12/10* | (2009.01) | |
| *H04L 29/06* | (2006.01) | |
| *H04W 12/02* | (2009.01) | |
| *H04W 84/04* | (2009.01) | |
| *H04W 12/12* | (2009.01) | |

(56) References Cited

U.S. PATENT DOCUMENTS

| | | | |
|---|---|---|---|
| 2007/0297367 A1 | 12/2007 | Wang et al. | |
| 2008/0101598 A1* | 5/2008 | Dillaway | 380/44 |
| 2009/0016254 A1* | 1/2009 | Lee et al. | 370/312 |
| 2009/0046631 A1* | 2/2009 | Meylan et al. | 370/328 |
| 2009/0111476 A1* | 4/2009 | Hamalainen et al. | 455/450 |
| 2009/0213779 A1 | 8/2009 | Zhang et al. | |
| 2009/0239554 A1* | 9/2009 | Sammour et al. | 455/458 |
| 2009/0307766 A1* | 12/2009 | Rose et al. | 726/13 |
| 2010/0014456 A1* | 1/2010 | Aberg et al. | 370/328 |
| 2010/0042844 A1 | 2/2010 | Zou et al. | |
| 2010/0151822 A1* | 6/2010 | Medvinsky et al. | 455/410 |
| 2010/0246599 A1* | 9/2010 | Wang et al. | 370/465 |
| 2010/0260096 A1* | 10/2010 | Ulupinar et al. | 370/315 |
| 2012/0028631 A1* | 2/2012 | Chun et al. | 455/422.1 |

FOREIGN PATENT DOCUMENTS

| | | |
|---|---|---|
| CN | 101080097 A | 11/2007 |
| CN | 101150498 A | 3/2008 |
| CN | 101296482 A | 10/2008 |
| CN | 101299832 A | 11/2008 |
| CN | 101473668 A | 7/2009 |
| CN | 101483888 A | 7/2009 |
| CN | 101534236 A | 9/2009 |
| CN | 101883359 A | 11/2010 |
| ES | 2189944 T3 | 7/2003 |
| WO | WO 2007130637 A2 | 11/2007 |
| WO | WO 2009152782 A1 | 12/2009 |

OTHER PUBLICATIONS

Extended European Search Report issued in corresponding European Patent Application No. 10818427.6, mailed Oct. 24, 2012.
Office Action and Search Report issued in corresponding Chinese Patent Application No. 201010105867.5, mailed Oct. 24, 2012.
Search Report issued in corresponding Chinese Patent Application No. 201010105867.5, dated Mar. 28, 2012.
Huawei, "66b#15 email: One description of Relay Alt 4" Agenda Item 7.4, 3GPP TSG-RAN2#67 Meeting. Shenzhen, China, Aug. 24-28, 2009. Tdoc R2-095305.
Huawei et al., "Relay Architecture in RAN3 Baseline Paper" Agenda Item 13.1 3GPP TSG RAN WG3 #65. Shenzhen, China, Aug. 24-28, 2009. R3-091775.
Huawei et al., "TP for Relay Architecture (was R3-091775)" 3GPP TSG RAN WG3 #65. Shenzhen, China, Aug. 24-28, 2009. R3-092111.

\* cited by examiner

METHOD, APPARATUS, AND SYSTEM FOR DATA TRANSMISSION

CROSS-REFERENCE TO RELATED APPLICATIONS

This application is a continuation of International Application No. PCT/CN2010/077342, filed on Sep., 27, 2010, which claims priority to Chinese Patent Application No. CN200910093753.0, filed on Sep. 28, 2009, and to Chinese Patent Application No. CN201010105867.5, filed on Feb. 3, 2010, both of which are incorporated herein by reference in their entireties.

FIELD OF THE INVENTION

The present invention relates to the field of communications technologies, and in particular, to a method, an apparatus, and a system for data transmission.

BACKGROUND OF THE INVENTION

With the continuous development of communication technologies, a relay (Relay) technology is proposed as a key technology used to increase the cell capacity and extend the coverage. Problems that existing cellular systems are faced with can be solved effectively by deploying a relay node (Relay Node; RN for short) on a network to enhance radio communication signals between a base station and a terminal. In addition, because the RN has such characteristics as low software costs, low hardware costs, low deployment costs, and flexible deployment, it has attracted wide attention and is researched by more and more operators and vendors.

In brief, the RN is a node that transfers data between the base station and the terminal, so that a radio signal can reach a destination through multiple transmissions (multiple hops). After the RN accesses a conventional base station, the conventional base station may be referred to as a donor base station (Donor evolved NodeB; DeNB for short). In the Third Generation Partnership Project (Third Generation Partnership Project; 3GPP for short) standard, the radio interface between the RN and the donor base station is a Un interface, and the radio interface between the user equipment (UE) and the RN is a Uu interface.

In an RN implementation solution in the prior art, the RN accesses a network in a mode similar to the access mode used by the UE. The RN establishes a signaling bearer and a user data bearer with the network. All signaling and data related to a UE that camps on the RN are transmitted through the user data bearer between the RN and the network. However, the user data bearer can provide only cipher protection. Therefore, only the cipher protection is available when control plane signaling related to the UE that camps on the RN is transmitted between the RN and the donor base station.

The control plane signaling related to the UE that camps on the RN includes access stratum (Access Stratum; AS for short) signaling and non access stratum (Non Access Stratum; NAS for short) signaling that are exchanged between the UE and the network, and signaling that is exchanged inside the network for the purpose of providing the UE with services, such as S1 interface signaling defined in a long term evolution (Long Term Evolution; LTE for short) system. The S1 interface signaling includes signaling of sensitive information, for example, signaling for transmitting a key Kenb used to protect the Uu interface communication. Because the above signaling can only be transmitted over the user data bearer on the RN, only the cipher protection is available to the signaling according to the RN implementation solution in the prior art. Even if the cipher protection is available, attackers can manipulate the key Kenb obtained by the RN by altering the signaling, which may cause attacks, such as a denial of a service attack.

SUMMARY OF THE INVENTION

Embodiments of the present invention provide a method, an apparatus, and a system for data transmission, so that when control plane signaling is transmitted between an RN and a donor base station, better protection is provided for the control plane signaling related to a UE that camps on the RN.

An embodiment of the present invention provides a method for data transmission, including:
determining that data to be transmitted is control plane signaling related to a UE that camps on an RN; and
transmitting the data through a first user data bearer established between the RN and a donor base station, where the first user data bearer provides integrity protection for the data to be transmitted.

An embodiment of the present invention provides an RN capable of communicating with a Donor base station, including:
a bearer establishing module, configured to establish a first user data bearer between the RN and the Donor base station;
a first type identifying module, configured to determine the data type of uplink data to be transmitted; and
a first transmitting module, configured to transmit the uplink data to be transmitted to the Donor base station through the first user data bearer established by the bearer establishing module when the first type identifying module determines that the data type of the uplink data to be transmitted is control plane signaling related to a UE that camps on the RN, where the first user data bearer provides integrity protection for the uplink data to be transmitted.

An embodiment of the present invention provides a Donor base station capable of communicating with an RN, including:
a third type identifying module, configured to determine the data type of downlink data to be transmitted; and
a fifth transmitting module, configured to transmit the downlink data to be transmitted to the RN through a first user data bearer established between the RN and the Donor base station when the third type identifying module determines that the data type of the downlink data to be transmitted is control plane signaling related to a UE that camps on the RN, where the first user data bearer provides integrity protection for the downlink data to be transmitted.

In embodiments of the present invention, control plane signaling related to a UE that camps on an RN is transmitted through a first user data bearer between the RN and the Donor base station, where the first user data bearer provides integrity protection for the control plane signaling between the RN and the Donor base station. In this way, when the control plane signaling related to the UE that camps on the RN is transmitted, integrity protection is provided for the control plane signaling.

DETAILED DESCRIPTION OF THE EMBODIMENTS

Figure 1:
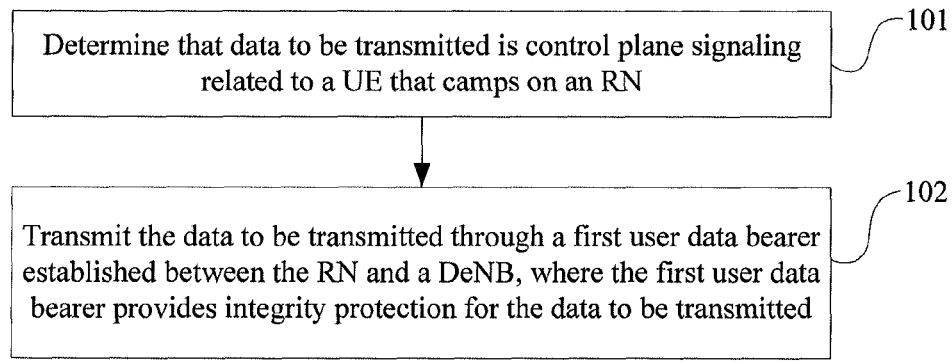
FIG. 1 is a flowchart of an embodiment of a method for data transmission according to the present invention.

FIG. 1 is a flowchart of an embodiment of a method for data transmission according to the present invention. As shown in FIG. 1, the embodiment includes the following steps:

Step 101: Determine that data to be transmitted is control plane signaling related to a UE that camps on an RN.

Specifically, the identifier bit(s) in the packet header of the data to be transmitted may be parsed, and according to a value of the identifier bit(s), it is determined that the data to be transmitted is the control plane signaling related to the UE that camps on the RN. The above identifier bit(s) may include one or any combination of the following: a protocol (Protocol)/next packet header (next header) field, a source Internet Protocol (Internet Protocol; IP for short) address, a destination IP address, a tunnel endpoint identifier (Tunnel Endpoint Identifier; TEID for short) and a Packet Data Convergence Protocol (Packet Data Convergence Protocol; PDCP for short) header control plane/user plane (Control plane or User plane; C/U for short) indication, where the C/U indication is used to indicate whether signaling or user data is transmitted in a PDCP packet.

Step 102: Transmit the data to be transmitted through a first user data bearer established between the RN and a Donor base station, where the first user data bearer provides integrity protection for the data to be transmitted.

The above method for providing integrity protection includes the following: In a process of accessing the Donor base station by the RN, the RN negotiates security context information such as an integrity algorithm and an integrity key with the Donor base station; by using the security context information, the RN and the Donor base station can provide integrity protection for data transmitted on the first user data bearer, so that the first user data bearer has the capability to provide integrity protection.

In an implementation of this embodiment, a dedicated data radio bearer (Data Radio Bearer; DRB for short) may be used to carry signaling and perform integrity protection, where the dedicated DRB carries only signaling and does not carry data. In this embodiment, the dedicated DRB is used to carry upper layer signaling in a relay link. The dedicated DRB in the relay link is part of the first user data bearer.

In this implementation, after it is determined that the data to be transmitted is control plane signaling related to the UE that camps on the RN, a transmitting device of the relay link obtains a control indication set for the first user data bearer, and executes, according to the control indication, the step of transmitting the data through the first user data bearer established between the RN and the Donor base station. Specifically, the executing, according to the control indication, the step of transmitting the data through the first user data bearer established between the RN and the Donor base station may include: setting, according to the control indication, the attribute of a PDCP peer layer to activate integrity protection or to the data to be transmitted being control plane signaling related to the UE that camps on the RN; and executing, according to the set attribute of the PDCP peer layer, the step of transmitting the data through the first user data bearer established between the RN and the Donor base station. When the transmitting device of the relay link is the Donor base station, a receiving device of the relay link is the RN; or when the transmitting device of the relay link is the RN, the receiving device of the relay link is the Donor base station.

Specifically, when the first user data bearer is established, the packet data network gateway of the RN sets a control indication for the first user data bearer, where the control indication is used to indicate that a PDCP entity of the transmitting device of the relay link provides integrity protection for the data to be transmitted; or the control indication is used to indicate that a PDCP entity of the receiving device of the relay link performs integrity detection on the received data. The packet data network gateway of the RN may transmit the control indication to a serving gateway of the RN through an S5 message; the serving gateway of the RN may transmit the control indication to a mobility management entity (MME) of the RN through an S11 message; the MME of the RN transmits the control indication to the Donor base station through an S1 Application Protocol (S1 Application Protocol; S1AP for short) message; the Donor base station may transmit the control indication to the RN through a radio resource control (Radio Resource Control; RRC for short) message. In this way, the Donor base station and the RN may obtain the control indication set for the first user data bearer.

Then, the Donor base station and the RN each set the attribute of the PDCP peer layer of the dedicated DRB in the relay link according to the control indication. The attribute of the PDCP peer layer of the dedicated DRB in the relay link may include: activating integrity protection or the data to be transmitted being control plane signaling related to the UE that camps on the RN.

When the attribute of the PDCP peer layer is set to activate integrity protection, the PDCP entity of the transmitting device of the relay link provides integrity protection for the data in the process of processing the data; when the attribute of the PDCP peer layer is set to the data to be transmitted being the control plane signaling related to the UE that camps on the RN, the PDCP entity of the transmitting device of the relay link provides integrity protection for the data in the process of processing the data to be transmitted.

The above mode is only one of setting modes of the control indication, and this embodiment is not limited to this mode. The packet data network gateway of the RN may also set the control indication to indicate whether the PDCP entity of the transmitting device of the relay link provides integrity protection for the data to be transmitted or to indicate whether the PDCP entity of the receiving device of the relay link performs integrity detection on the received data. Accordingly, the attribute of the PDCP peer layer of the dedicated DRB in the relay link may include: activating integrity protection, deactivating integrity protection, the data to be transmitted being control plane signaling related to the UE that camps on the RN, or the data to be transmitted being user plane data related to the UE that camps on the RN. When the attribute of the PDCP peer layer is set to activate integrity protection, the PDCP entity of the transmitting device of the relay link provides integrity protection for the data to be transmitted in the process of processing the data to be transmitted; when the PDCP peer layer is set to deactivate integrity protection, the PDCP entity of the transmitting device does not provide integrity protection for the data to be transmitted. For the PDCP entity of the receiving device, a corresponding action is performing integrity detection on the data to be transmitted, and is not further described.

When the attribute of the PDCP peer layer is set to the data to be transmitted being the control plane signaling related to the UE that camps on the RN, the PDCP entity of the transmitting device of the relay link provides integrity protection for the data to be transmitted in the process of processing the data to be transmitted. Conversely, when the PDCP peer layer is set to the data to be transmitted being the user plane data related to the UE that camps on the RN, the PDCP entity of the transmitting device does not provide integrity protection for the data to be transmitted. For the PDCP entity of the receiving device, the corresponding action is performing integrity detection on the data to be transmitted, and is not further described.

In another implementation of this embodiment, a shared DRB may be used to carry signaling and provide integrity protection. The shared DRB carries both the signaling and the data, so that the quantity of DRBs does not need to be extended in the relay link. In this embodiment, the shared DRB is used in the relay link to carry upper layer signaling. The shared DRB in this relay link is part of the first user data bearer.

When the PDCP entity of the transmitting device of the relay link processes the data to be transmitted, it can detect the data type of the data to be transmitted. When it is determined, according to a detection result, that the data is control plane signaling related to the UE that camps on the RN, the PDCP entity of the transmitting device of the relay link provides integrity protection for the data to be transmitted, and carries the control indication in the data to be transmitted, where the control indication is used to indicate that integrity protection is provided for the data to be transmitted, so that a device that receives the data to be transmitted can perform integrity detection on the received data to be transmitted according to the control indication. Specifically, the control indication may be carried in a PDCP protocol data unit (Protocol Data Unit; PDU for short), and set to ON, which is used to indicate that the PDCP entity of the transmitting device of the relay link provides integrity protection for the data to be transmitted. When processing the PDCP PDU, the PDCP entity of the receiving device of the relay link can perform integrity detection according to the control indication in the PDCP PDU. That is, when the control indication is ON, the PDCP entity of the receiving device performs integrity detection. Certainly, this embodiment is not limited to this setting mode. The above setting mode is only an example of setting the control indication. The control indication may be set in another mode. So long as whether the PDCP entity of the transmitting device of the relay link executes integrity protection is indicated, the setting mode of the control indication is not limited in this embodiment.

To implement detection on the data type of the data to be transmitted, a data packet type detection function needs to be added for the PDCP entity to detect whether the data to be transmitted is the control plane signaling related to the UE that camps on the RN or the user plane data related to the UE that camps on the RN. The method for detecting the data type of the data to be transmitted is a preset rule. The PDCP entity of the transmitting device or the receiving device may apply this rule to judge whether the data to be transmitted is the control plane signaling related to the UE that camps on the RN or the user plane data related to the UE that camps on the RN. Specifically, the method for detecting the data type of the data to be transmitted may include identifying the type of service of the IP header or identifying the upper layer protocol of the IP header.

(1) Identifying the Type of Service of the IP Header

A reliability (Reliability) and/or delay (delay) field in the type of service (Type of Service; TOS for short) field of the IP header is set as follows: If the value of the reliability field and/or the delay field is 1, it indicates that the data to be transmitted is the control plane signaling related to the UE that camps on the RN; if the value of the reliability field and/or the delay field is 0, it indicates that the data to be transmitted is the user plane data related to the UE that camps on the RN. Certainly, this embodiment is not limited to this setting mode. Other setting modes may also be used to indicate whether the data to be transmitted is the control plane signaling related to the UE that camps on the RN or the user plane data related to the UE that camps on the RN. The setting modes are not limited in this embodiment.

In this embodiment, when a signaling transmitting device transmits signaling, the signaling transmitting device sets the reliability field and/or the delay field in the TOS field of the IP header to 1, where the signaling transmitting device may be the MME of the UE, the packet data network gateway of the RN, the Donor base station, or the RN. When the data transmitting device transmits data, the data transmitting device sets the reliability field and/or the delay field in the TOS field of the IP header to 0.

After receiving data to be transmitted, the PDCP entity of the transmitting device of the relay link determines whether the data to be transmitted is the control plane signaling related to the UE that camps on the RN or the user plane data related to the UE that camps on the RN may be determined according to the value of the reliability field and/or the delay field in the TOS field of the IP header of the data to be transmitted.

(2) Identifying the Upper Layer Protocol of the IP Header

In a relay system, signaling is first carried by using the Stream Control Transmission Protocol (Stream Control Transmission Protocol; SCTP for short) and then carried by using IP; data is first carried by using the User Datagram Protocol (User Datagram Protocol; UDP for short), and then carried by using IP. The upper layer protocol identifier of the IP header may be used to identify whether the upper layer protocol is SCTP or UDP, and further determine whether the upper layer is signaling or data. Therefore, after the PDCP entity of the transmitting device of the relay link receives the data to be transmitted, the upper layer protocol identifier of the IP header can be detected. If the upper layer protocol is SCTP, it is determined that the data to be transmitted may be control plane signaling related to the UE that camps on the RN; if the upper layer protocol is UDP, it is determined that the data to be transmitted may be user plane data related to the UE that camps on the RN.

Certainly, this embodiment is not limited to this detection method. Other methods may also be used to detect the data type of the data to be transmitted. So long as the data type of the data to be transmitted can be detected and the transmitting device and the receiving device use a same detection method, the detection method is not limited in this embodiment.

Further, once the PDCP entity of the relay link detects the data type of the data to be transmitted, priority scheduling may be further performed by using a detection result, for example, the control plane signaling related to the UE that camps on the RN may be scheduled first, so that different priority processing is performed on one DRB.

This embodiment may further include: when it is determined that the data to be transmitted is the user plane data related to the UE that camps on the RN, transmitting the data to be transmitted through a second user data bearer established between the RN and the Donor base station, where the second user data bearer provides cipher protection for the data to be transmitted. Specifically, the method for determining that the data to be transmitted is the user plane data related to the UE that camps on the RN may refer to the method for determining that the data to be transmitted is the control plane signaling related to the UE that camps on the RN in step 101, and is not further described.

In this embodiment, in the process of accessing the network by the RN, the RN exchanges information with the Donor base station. In the process of accessing the Donor base station by the RN or after there is a UE that camps on the RN, a first user data bearer is established on the radio interface between the RN and the Donor base station, where the first user data bearer can, between the RN and the Donor base station, provide either integrity protection or cipher protection for the data to be transmitted.

In the process of accessing the Donor base station by the RN or after there is a UE that camps on the RN, a second user data bearer is established between the RN and the Donor base station, where the second user data bearer can, between the RN and the Donor base station, provide cipher protection for the data to be transmitted.

In this embodiment, determining the data type of the data to be transmitted and establishing the user data bearers may be performed in any sequence, so long as it can be guaranteed that a user data bearer is available when data transmission is implemented. For example, the first user data bearer and the second user data bearer may be first established, the data type of the data to be transmitted is determined when data needs to be transmitted, and the data is transmitted through the first user data bearer or the second user data bearer according to the data type; or the data type of the data to be transmitted may be first determined, the first user data bearer or the second user data bearer is established according to the data type, and the data to be transmitted is transmitted through the first user data bearer or the second user data bearer.

In this embodiment, the control plane signaling related to the UE that camps on the RN is transmitted through the first user data bearer. Therefore, the first user data bearer is also referred to as a signaling bearer. This signaling bearer is different from the existing signaling bearers in that what is transmitted on the signaling bearer is the control plane signaling related to the UE that camps on the RN, which is applicable to the following descriptions.

In this embodiment, the first user data bearer and the second user data bearer indicate two types of user data bearer, and the "first" and "second" expressions are used only for better description, and do not represent specific quantity and specific priorities, which is applicable to the following descriptions.

In this embodiment, the cipher protection involves a case that the UE and the network select a null cipher algorithm to provide cipher protection, where the null cipher algorithm is a possible cipher algorithm. When the UE and the network select the null cipher algorithm to provide cipher protection, no cipher protection is provided for the communication between the UE and the network.

In this embodiment, when it is determined that the data to be transmitted is the control plane signaling related to the UE that camps on the RN, the data to be transmitted is transmitted through the first user data bearer; the first user data bearer provides cipher and integrity protection for the data between the RN and the Donor base station. In this way, when control plane signaling related to the UE that camps on the RN is transmitted between the RN and the Donor base station, integrity protection is provided for the control plane signaling, and therefore attacks such as the denial of a service attack are prevented.

Figure 2:
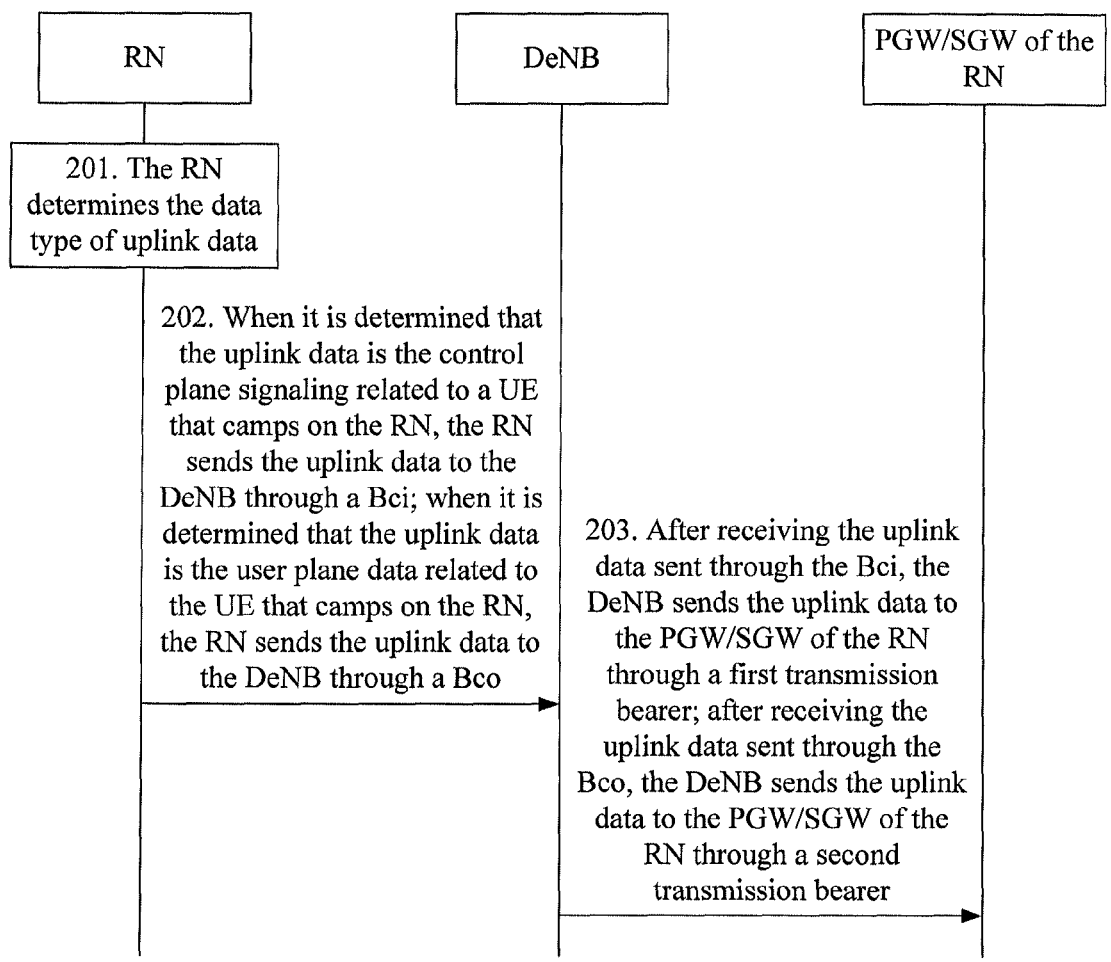
FIG. 2 is a flowchart of another embodiment of a method for data transmission according to the present invention.
Figure 3:
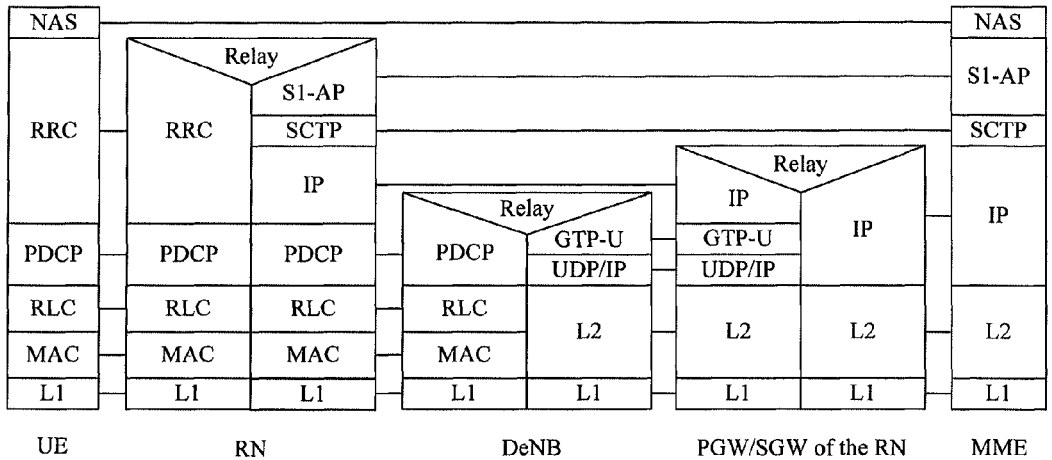
FIG. 3(a) is a schematic diagram of an embodiment of a signaling plane protocol stack according to the present invention.
FIG. 3(b) is a schematic diagram of an embodiment of a user plane protocol stack according to the present invention.
Figure 3:
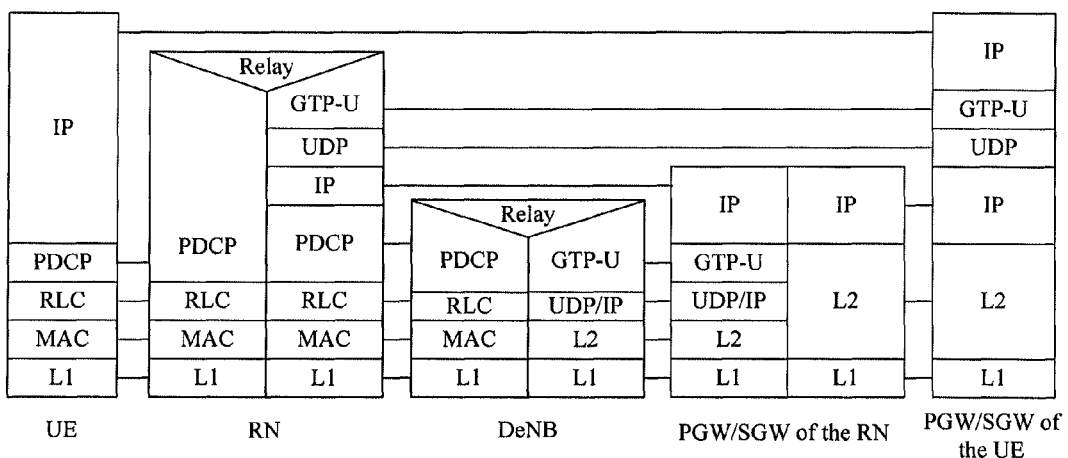

FIG. 2 is a flowchart of another embodiment of a method for data transmission according to the present invention. In this embodiment, a first user data bearer is a bearer that provides cipher and integrity protection (Bearer cipher and integrity; Bci for short), and a second user data bearer is a bearer that provides cipher protection only (Bearer cipher only; Bco for short). This embodiment assumes that data to be transmitted is uplink data to be transmitted on an RN. A signaling plane protocol stack used in this embodiment is shown in FIG. 3(*a*), which is a schematic diagram of an embodiment of a signaling plane protocol stack. A user plane protocol stack used in this embodiment is shown in FIG. 3(*b*), which is a schematic diagram of an embodiment of a user plane protocol stack.

As shown in FIG. 2, the embodiment may include the following steps:

Step 201: The RN determines a data type of uplink data, where the data type includes control plane signaling and user plane data.

Specifically, the RN may parse identifier bit(s) in the packet header of the uplink data, and determine, according to a value of the identifier bit(s), whether the uplink data is control plane signaling or user plane data related to a UE that camps on the RN. The above identifier bit(s) may include one or any combination of the following: a Protocol/next header field, a source IP address, a destination IP address, a TEID, and a PDCP header C/U indication.

For example, when the identifier bit(s) are the Protocol/next header field, the RN may parse the Protocol/next header field in the packet header of the uplink data. If the value of the Protocol/next header field is 132, it may be determined that the uplink data is the control plane signaling related to the UE that camps on the RN. If the value of the Protocol/next header field is 17, it may be determined that the uplink data is the user plane data related to the UE that camps on the RN.

The above is only an example of identifying the data type of the uplink data, and this embodiment is not limited to this identifying method. The data type of the uplink data can be identified by using fields other than the Protocol/next header field, for example, an IP address. Because the IP address of a mobility management entity (Mobile Management Entity; MME for short) is different from the IP address of the PGW/SGW of the UE, the RN may identify, by using a destination IP address, whether the uplink data is user plane data sent to the PGW/SGW of the UE or control plane signaling sent to the MME. Any method that can identify the data type of the uplink data should fall into the protection scope of the present invention.

Step 202: When it is determined that the uplink data is the control plane signaling related to the UE that camps on the RN, the RN transmits the uplink data to the Donor base station through the Bci; when it is determined that the uplink data is the user plane data related to the UE that camps on the RN, the RN transmits the uplink data to the Donor base station through the Bco.

In this embodiment, in a process of accessing the network by the RN, the RN exchanges information with the Donor base station, and the Bci and the Bco are established between the RN and the Donor base station. The Bci can provide cipher and integrity protection for the uplink data between the RN and the Donor base station, while the Bco can provide cipher protection for the uplink data between the RN and the Donor base station. Specifically, in the process of accessing the Donor base station by the RN, the RN negotiates such security context information as a cipher algorithm, an integrity algorithm, a cipher key, and an integrity key with the Donor base station. The RN and the Donor base station provide cipher and integrity protection for the data transmitted over the Bci by using the above security context information, so that the Bci is capable of providing integrity protection. The RN and the Donor base station provide cipher protection for the data transmitted over the Bco by using the negotiated security context information such as a cipher algorithm and a cipher key, so that the Bco is capable of providing cipher protection only.

When the RN establishes the Bci with the Donor base station, a first transmission bearer corresponding to the Bci is established between the Donor base station and an evolved packet core network node of the RN. When the RN establishes the Bco with the Donor base station, a second transmission bearer corresponding to the Bco is established between the Donor base station and the evolved packet core network node of the RN.

The first transmission bearer and the second transmission bearer may be a General Packet Radio Service Tunneling Protocol (General Packet Radio Service Tunneling Protocol; GTP for short) tunnel. The evolved packet core network node of the RN is a Packet Data Network Gateway (Packet Data Network Gateway; PGW for short)/serving gateway (Service Gateway; SGW for short) of the RN.

The Bci and the first transmission bearer correspond to a first evolved packet system (Evolved Packet System; EPS for short) bearer between the RN and the PGW/SGW of the RN; the Bco and the second transmission bearer correspond to a second EPS bearer between the RN and the PGW/SGW of the RN. In the actual implementation, the RN and the PGW/SGW of the RN establish two different evolved packet system (Evolved Packet System; EPS for short) bearers, namely, a first EPS bearer and a second EPS bearer. The first EPS bearer between the RN and the Donor base station is the Bci, and the first EPS bearer between the Donor base station and the PGW/SGW of the RN is the first transmission bearer. Similarly, the second EPS bearer between the RN and the Donor base station is the Bco, and the second EPS bearer between the Donor base station and the PGW/SGW of the RN is the second transmission bearer.

The process of establishing the first EPS bearer and the second EPS bearer may be as follows: The RN and the Donor base station establish the Bci and the Bco through a radio bearer setup message; the Donor base station and the PGW/SGW of the RN establish the first transmission bearer and the second transmission bearer through a GTP tunnel or Proxy Mobile Internet Protocol (Proxy Mobile Internet Protocol; PMIP for short) tunnel setup procedure. The combination of the Bci and the first transmission bearer is the first EPS bearer, and the combination of the Bco and the second transmission bearer is the second EPS bearer.

In the process of accessing the network by the RN or after a UE camps on the RN, the first EPS bearer and the second EPS bearer are established between the RN and the PGW/SGW of the RN; or in the process of accessing the network by the RN, the first EPS bearer is established between the RN and the PGW/SGW of the RN, and after a UE camps on the RN, the second EPS bearer is established between the RN and the PGW/SGW of the RN; or in the process of accessing the network by the RN, the second EPS bearer is established between the RN and the PGW/SGW of the RN, and after a UE camps on the RN, the first EPS bearer is established between the RN and the PGW/SGW of the RN.

Step 203: After receiving the uplink data sent through the Bci, the Donor base station transmits the uplink data to the PGW/SGW of the RN through the first transmission bearer; after receiving the uplink data sent through the Bco, the Donor base station transmits the uplink data to the PGW/SGW of the RN through the second transmission bearer.

In this embodiment, after receiving the uplink data sent through the Bci, the Donor base station maps the uplink data to the first transmission bearer according to a mapping relationship between the bearer identifier of the Bci and the bearer identifier of the first transmission bearer stored on the Donor base station, and transmits the uplink data to the PGW/SGW of the RN through the first transmission bearer.

After the Donor base station receives the uplink data sent through the Bco, the Donor base station maps the uplink data to the second transmission bearer according to the mapping relationship between the bearer identifier of the Bco and the bearer identifier of the second transmission bearer stored on the Donor base station, and transmits the uplink data to the PGW/SGW of the RN through the second transmission bearer.

In this embodiment, the bearer identifier of the first transmission bearer may be the TEID of the first transmission bearer. Likewise, the bearer identifier of the second transmission bearer may be the TEID of the second transmission bearer.

In the above embodiment, when it is determined that the uplink data is the control plane signaling related to the UE that camps on the RN, the RN transmits the uplink data to the Donor base station through the Bci; the Donor base station transmits the uplink data to the PGW/SGW of the RN through the first transmission bearer corresponding to the Bci; the Bci provides cipher and integrity protection for the uplink data between the RN and the Donor base station. In this way, when the control plane signaling related to the UE that camps on the RN is transmitted between the RN and the Donor base station, integrity protection is provided for the control plane signaling, and therefore attacks such as the denial of a service attack are prevented.

Figure 4:
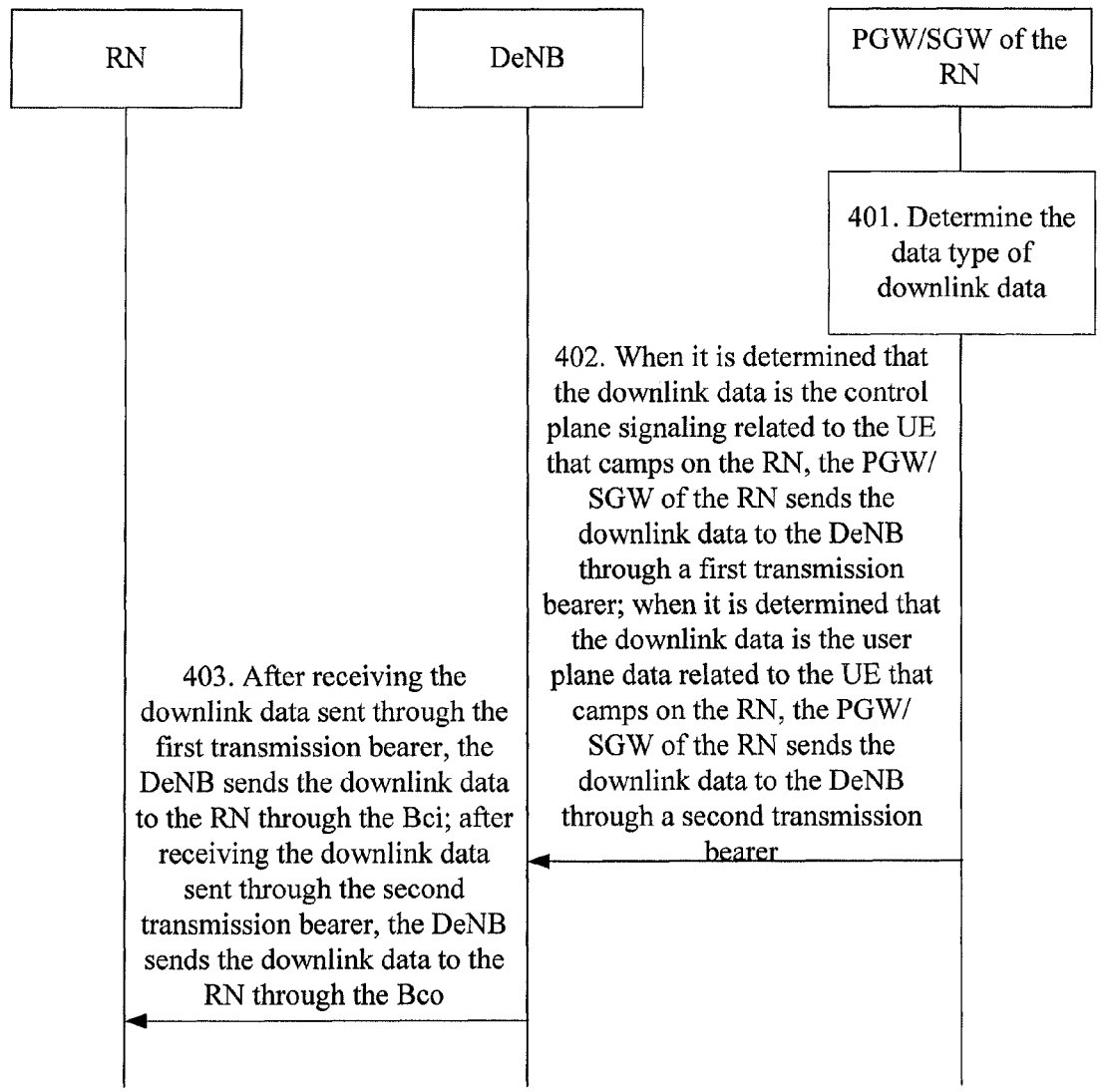
FIG. 4 is a flowchart of still another embodiment of a method for data transmission according to the present invention.

FIG. 4 is a flowchart of still another embodiment of a method for data transmission according to the present invention. In this embodiment, a first user data bearer is a Bci, and a second user data bearer is a Bco. This embodiment assumes that data to be transmitted is downlink data to be transmitted on an evolved packet core network node of an RN. A signaling plane protocol stack used in this embodiment is shown in FIG. 3(a), and a user plane protocol stack used in this embodiment is shown in FIG. 3(b).

As shown in FIG. 4, the embodiment may include the following steps:

Step 401: The evolved packet core network node of the relay node determines the data type of the downlink data, where the data type includes control plane signaling and user plane data.

In this embodiment, the evolved packet core network node of the relay node is a PGW/SGW of the relay node. Specifically, the PGW/SGW of the relay node may parse identifier bit(s) in the packet header of the downlink data, and determine, according to the value of the identifier bit(s), whether the downlink data is control plane signaling or user plane data related to a UE that camps on the relay node. The above identifier bit(s) may include one or any combination of the following: a Protocol/next header field, a source IP address, a destination IP address, a TEID, and a PDCP header C/U indication.

For example, when the identifier bit(s) are the Protocol/next header field, the PGW/SGW of the RN may parse the Protocol/next header field in the packet header of the downlink data. If the value of the Protocol/next header field is 132, it may be determined that the downlink data is the control plane signaling related to the UE that camps on the RN. If the value of the Protocol/next header field is 17, it may be determined that the downlink data is the user plane data related to the UE that camps on the RN.

The above is only an example of identifying the data type of the downlink data, and this embodiment is not limited to this identifying method. The data type of the uplink data can be identified by using fields other than the Protocol/next header field, for example, an IP address. Because the IP address of an MME is different from the IP address of the PGW/SGW of the UE, the PGW/SGW of the RN may identify, by using the source IP address, whether the downlink data is the user plane data sent from the PGW/SGW of the UE or the control plane signaling sent from the MME. Any method that can identify the data type of the downlink data should fall into the scope of the present invention.

Step 402: When it is determined that the downlink data is the control plane signaling related to the UE that camps on the RN, the PGW/SGW of the RN transmits the downlink data to the Donor base station through a first transmission bearer; when it is determined that the downlink data is the user plane data related to the UE that camps on the RN, the PGW/SGW of the RN transmits the downlink data to the Donor base station through a second transmission bearer.

In this embodiment, the methods for establishing the Bci, the Bco, the first transmission bearer, and the second transmission bearer are the same as that provided in step 202, and are not further described. The Bci provides cipher and integrity protection for the downlink data between the RN and the Donor base station, and the Bco provides cipher protection for the downlink data between the RN and the Donor base station.

Step 403: After receiving the downlink data sent through the first transmission bearer, the Donor base station transmits the downlink data to the RN through the Bci; after receiving the downlink data sent through the second transmission bearer, the Donor base station transmits the downlink data to the RN through the Bco.

In this embodiment, after the Donor base station receives the downlink data sent through the first transmission bearer, the Donor base station maps the downlink data to the Bci according to a mapping relationship between the bearer identifier of the Bci and the bearer identifier of the first transmission bearer stored on the Donor base station, and transmits the downlink data to the RN through the Bci.

After the Donor base station receives the downlink data sent through the second transmission bearer, the Donor base station maps the downlink data to the Bco according to a mapping relationship between the bearer identifier of the Bco and the bearer identifier of the second transmission bearer stored on the Donor base station, and transmits the downlink data to the RN through the Bco.

In this embodiment, the bearer identifier of the first transmission bearer may be the TEID of the first transmission bearer. Likewise, the bearer identifier of the second transmission bearer may be the TEID of the second transmission bearer.

In this embodiment, step 402 and step 403 are equivalent to the following process: When it is determined that the downlink data is the control plane signaling related to the UE that camps on the RN, the PGW/SGW of the RN transmits the downlink data to the Donor base station through the first transmission bearer, and further transmits the downlink data to the RN through the Bci; when it is determined that the downlink data is the user plane data related to the UE that camps on the RN, the PGW/SGW of the RN transmits the downlink data to the Donor base station through the second transmission bearer, and further transmits the downlink data to the RN through the Bco.

In the above embodiment, when it is determined that the downlink data is the control plane signaling related to the UE that camps on the RN, the PGW/SGW of the RN transmits the downlink data to the Donor base station through the first transmission bearer, and the Donor base station transmits the downlink data to the RN through Bci corresponding to the first transmission bearer; the Bci provides cipher and integrity protection for the downlink data between the RN and the Donor base station. In this way, when the control plane signaling related to the UE that camps on the RN is transmitted between the RN and the Donor base station, integrity protection is provided for the control plane signaling, and therefore attacks such as the denial of a service attack are prevented.

Figure 5:
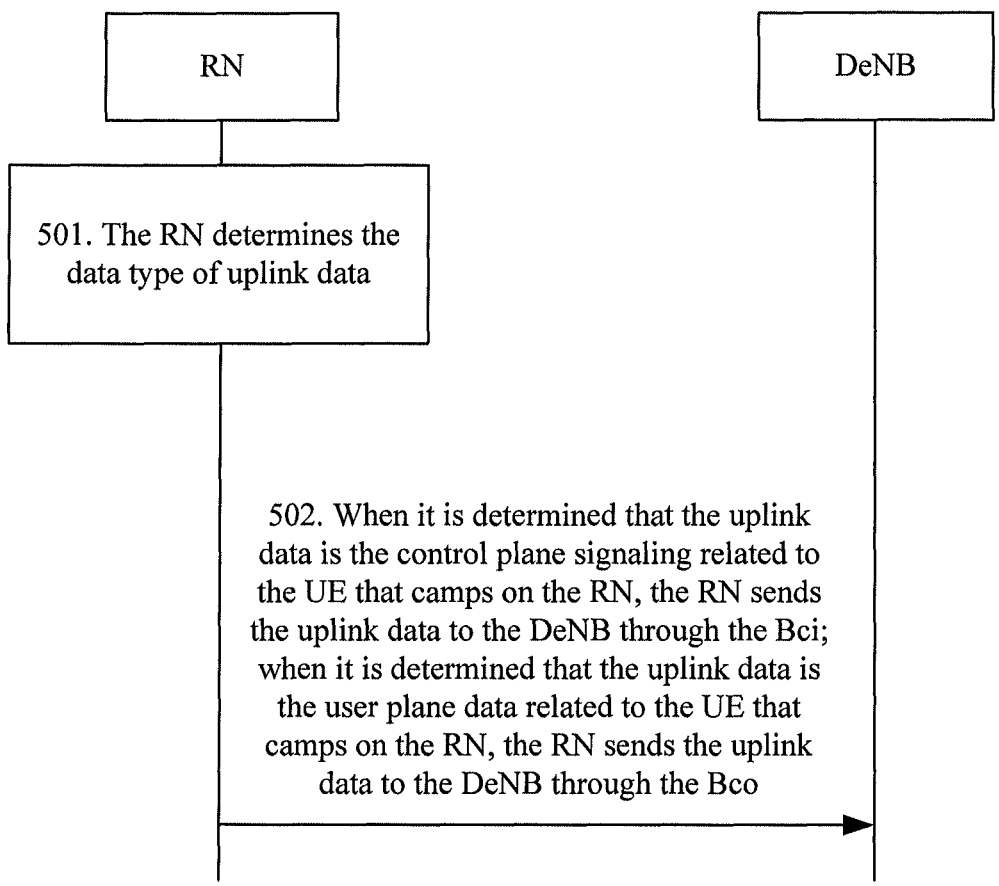
FIG. 5 is a flowchart of still another embodiment of a method for data transmission according to the present invention.
Figure 6:
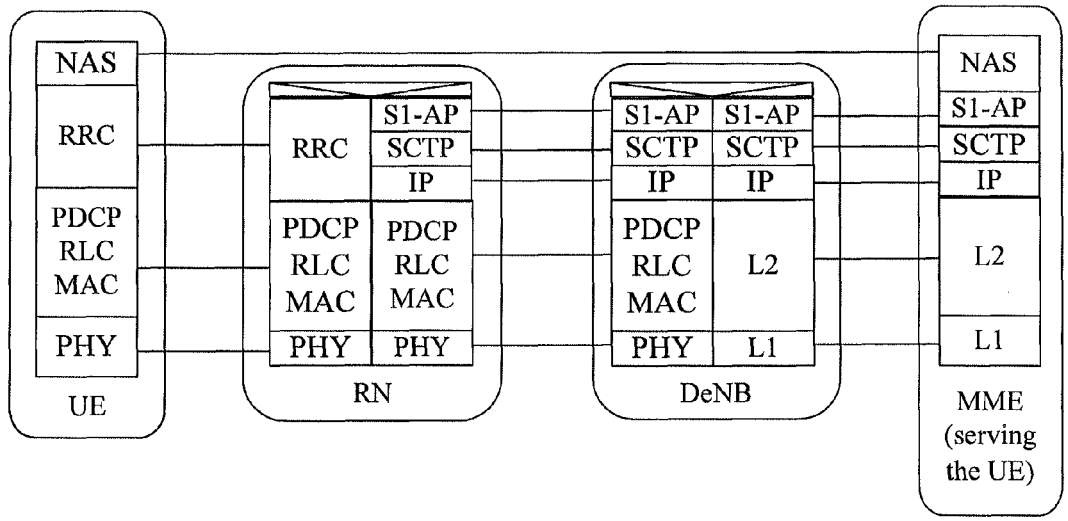
FIG. 6(a) is a schematic diagram of another embodiment of a signaling plane protocol stack according to the present invention.
FIG. 6(b) is a schematic diagram of another embodiment of a user plane protocol stack according to the present invention.
Figure 6:
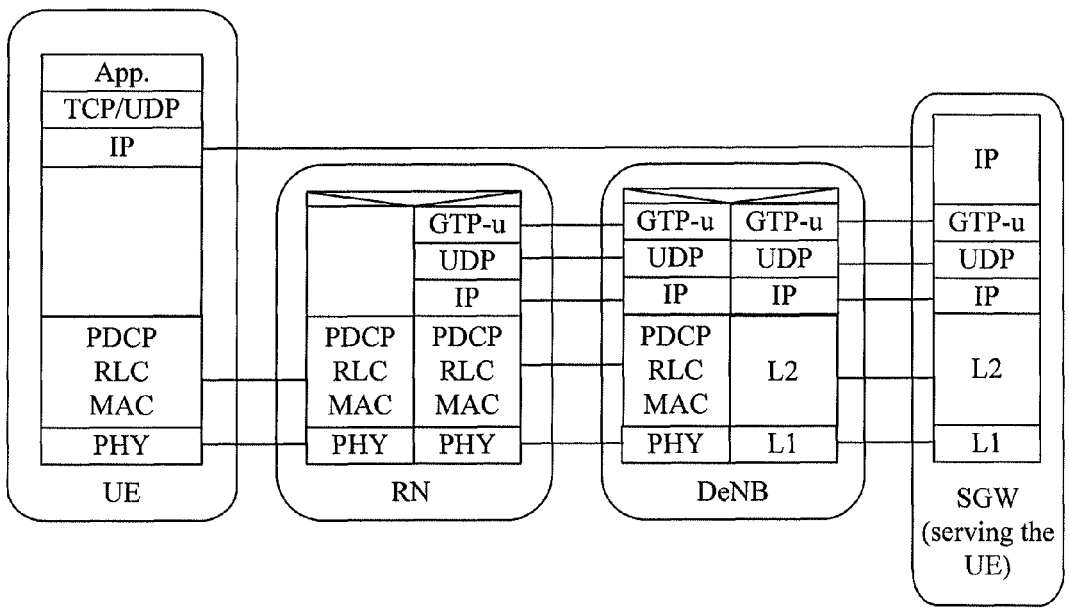

FIG. 5 is a flowchart of still another embodiment of a method for data transmission according to the present invention. In this embodiment, a first user data bearer is a Bci, and a second user data bearer is a Bco. This embodiment assumes that data to be transmitted is uplink data on an RN. A signaling plane protocol stack used in this embodiment is shown in FIG. 6(a), which is a schematic diagram of another embodiment of a signaling plane protocol stack. A user plane protocol stack used in this embodiment is shown in FIG. 6(b), which is a schematic diagram of another embodiment of a user plane protocol stack.

As shown in FIG. 5, the embodiment may include the following steps:

Step 501: The RN determines the data type of uplink data, where the data type includes control plane signaling and user plane data.

Specifically, the RN may determine the data type of the uplink data by using the method provided in step 201. The method is not further described.

Step 502: When it is determined that the uplink data is the control plane signaling related to the UE that camps on the RN, the RN transmits the uplink data to the Donor base station through the Bci; when it is determined that the uplink data is the user plane data related to the UE that camps on the RN, the RN transmits the uplink data to the Donor base station through the Bco.

In this embodiment, the methods for establishing the Bci and the Bco are the same as that provided in step 202, and are not further described. In the process of accessing the Donor base station by the RN or after there is a UE that camps on the RN, the Bci and the Bco are established on the Un interface between the RN and the Donor base station; or in the process of accessing the Donor base station by the RN, the Bci is established on the Un interface between the RN and the Donor base station, and after there is a UE that camps on the RN, the Bco is established on the Un interface between the RN and the Donor base station; or in the process of accessing the Donor base station by the RN, the Bco is established on the Un interface between the RN and the Donor base station; after there is a UE that camps on the RN, the Bci is established on the Un interface between the RN and the Donor base station.

In this embodiment, the Bco represents a type of user data bearer between the RN and the Donor base station, and the GTP tunnel represents a traffic stream transmitted by a user. In fact, each user may have multiple GTP tunnels, in which transmitted data is identified by the TEID in the GTP packet header. The RN and the Donor base station store a mapping relationship between the TEID of the GTP tunnel corresponding to each UE and the bearer identifier of the Bco. When the RN identifies that the uplink data is the user plane data related to the UE that camps on the RN, the RN needs to further parse the TEID field in the GTP packet header of the uplink data, map the uplink data to the corresponding Bco according to the stored mapping relationship between the TEID and the bearer identifier of the Bco, and transmit the uplink data to the Donor base station through the Bco.

In the above embodiment, when it is determined that the uplink data is the control plane signaling related to the UE that camps on the RN, the RN transmits the uplink data to the Donor base station through the Bci, and the Bci provides cipher and integrity protection for the uplink data between the RN and the Donor base station. In this way, when the control plane signaling related to the UE that camps on the RN is transmitted between the RN and the Donor base station, integrity protection is provided for the control plane signaling, and therefore attacks such as the denial of a service attack are prevented.

Figure 7:
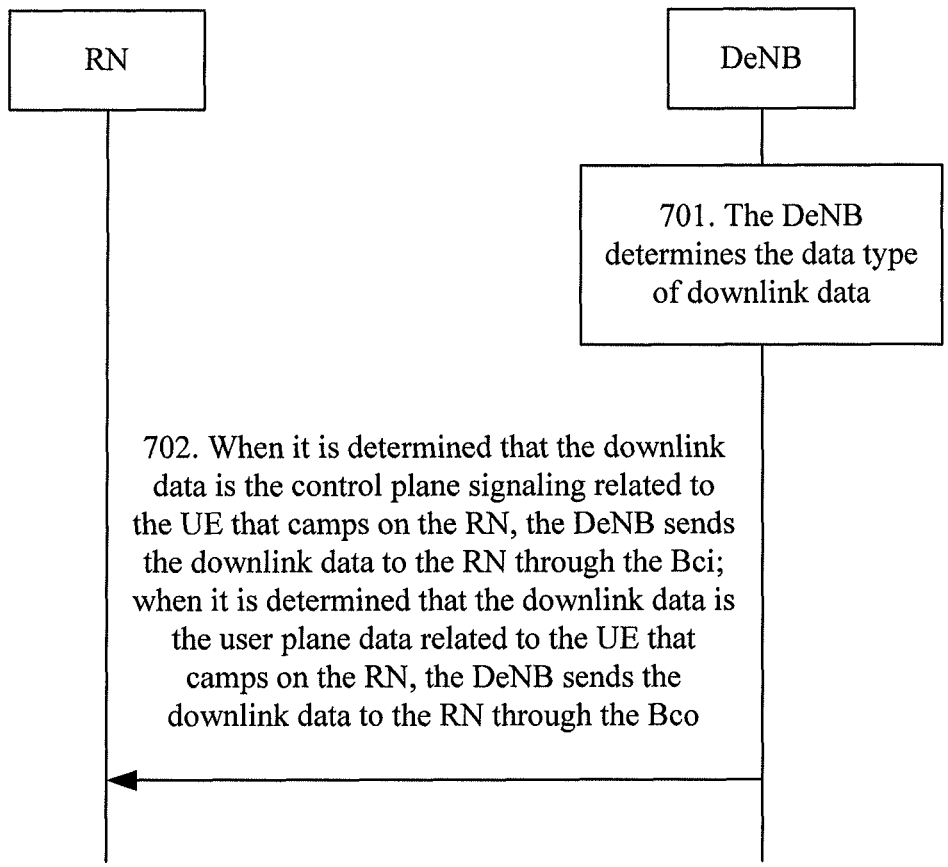
FIG. 7 is a flowchart of still another embodiment of a method for data transmission according to the present invention.

FIG. 7 is a flowchart of still another embodiment of a method for data transmission according to the present invention. In this embodiment, a first user data bearer is a Bci, and a second user data bearer is a Bco. This embodiment assumes that data to be transmitted is downlink data on a Donor base station. A signaling plane protocol stack used in this embodiment is shown in FIG. 6(a), and a user plane protocol stack used in this embodiment is shown in FIG. 6(b).

As shown in FIG. 7, the embodiment may include the following steps:

Step 701: The Donor base station determines the data type of the downlink data, where the data type includes control plane signaling and user plane data.

Specifically, the Donor base station may determine the data type of the downlink data by referring to the method provided in step 401.

Step 702: When it is determined that the downlink data is the control plane signaling related to the UE that camps on the RN, the Donor base station transmits the downlink data to the RN through the Bci; when it is determined that the downlink data is the user plane data related to the UE that camps on the RN, the Donor base station transmits the downlink data to the RN through the Bco.

In this embodiment, the methods for establishing the Bci and the Bco are the same as that provided in step 202, and are not further described.

In this embodiment, the Bco represents a type of user data bearer between the RN and the Donor base station, and the GTP tunnel represents a traffic stream transmitted by a user. In fact, each user may have multiple GTP tunnels, in which transmitted data is identified by the TEID in the GTP packet header. The RN and the Donor base station store a mapping relationship between the TEID of the GTP tunnel corresponding to each UE and the bearer identifier of the Bco. When the Donor base station identifies that the downlink data is user plane data related to the UE that camps on the RN, the Donor base station needs to further parse the TEID field in the GTP packet header of the downlink data, map the downlink data to the corresponding Bco according to the stored mapping relationship between the TEID and the bearer identifier of the Bco, and transmit the downlink data to the RN through the Bco.

In the above embodiment, when it is determined that the downlink data is the control plane signaling related to the UE that camps on the RN, the Donor base station transmits the downlink data to the relay node through the Bci, and the Bci provides cipher and integrity protection for the downlink data between the RN and the Donor base station. In this way, when the control plane signaling related to the UE that camps on the RN is transmitted between the RN and the Donor base station, integrity protection is provided for the control plane signaling, and therefore attacks such as the denial of a service attack are prevented.

Figure 8:
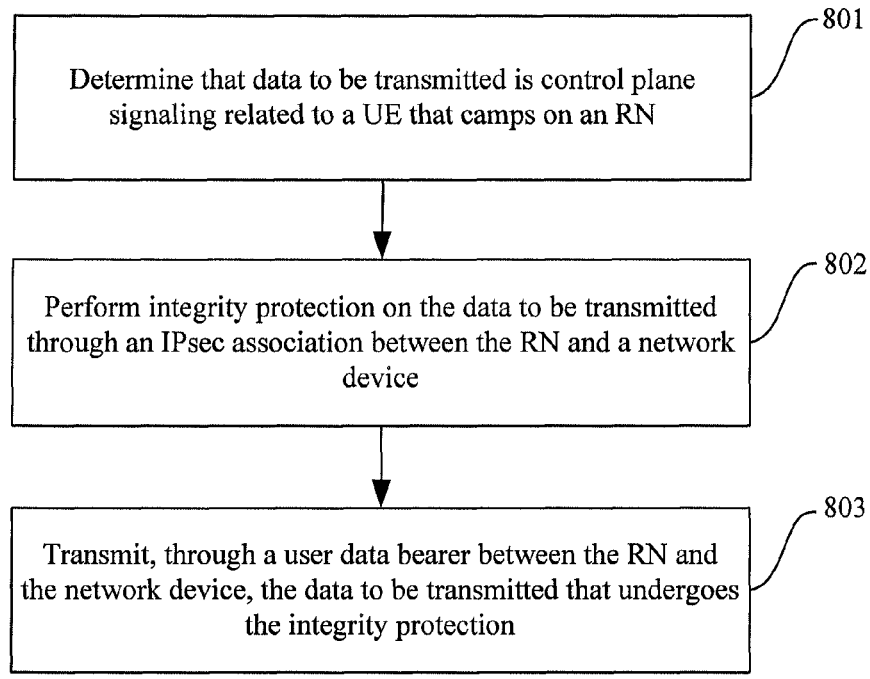
FIG. 8 is a flowchart of still another embodiment of a method for data transmission according to the present invention.

FIG. 8 is a flowchart of still another embodiment of a method for data transmission according to the present invention. As shown in FIG. 8, the embodiment may include the following steps:

Step 801: Determine that data to be transmitted is control plane signaling related to a UE that camps on an RN.

Specifically, when the data to be transmitted is uplink data, it may be determined that the uplink data is the control plane signaling related to the UE that camps on the RN by referring to the method provided in step 201; when the data to be transmitted is downlink data, it may be determined that the downlink data is the control plane signaling related to the UE that camps on the RN by referring to the method provided in step 401

Step 802: Perform integrity protection on the data to be transmitted through an IP security (Internet Protocol security; IPsec for short) association between the RN and a network device.

In this embodiment, after the RN accesses the network, the RN establishes a user data bearer and an IPsec association with the network device, where the IPsec association can provide integrity protection for the data. The IPsec association may be established between the RN and the Donor base station or between the RN and an evolved packet core network node of the RN, where the evolved packet core network node of the RN may be an MME or a PGW/SGW of the RN.

When the data to be transmitted is downlink data, the network device identifies the data type of the downlink data; when it is determined that the downlink data is the control plane signaling related to the UE that camps on the RN, the network device provides integrity protection for the downlink data through the IPsec association. In this embodiment, the network device may be the Donor base station or the PGW/SGW of the RN.

When the data to be transmitted is uplink data, the RN identifies the data type of the uplink data; when it is determined that the uplink data is the control plane signaling related to the UE that camps on the RN, the RN provides integrity protection for the uplink data through the IPsec association.

Step 803: Transmit, through a user data bearer between the RN and the network device, the data to be transmitted that undergoes the integrity protection.

In this embodiment, when the data to be transmitted is the control plane signaling related to the UE that camps on the RN, after the integrity protection is performed on the data to be transmitted, the data to be transmitted that undergoes the integrity protection is transmitted through a user data bearer between the RN and the network device.

When the data to be transmitted is the user plane data related to the UE that camps on the RN, the data to be transmitted may be transmitted directly through the user data bearer between the RN and the network device.

In the above embodiment, when it is determined that the data is the control plane signaling related to the UE that camps on the RN, the RN or the network device performs integrity protection on the data to be transmitted through the IPsec association, and then transmits, through a user data bearer between the RN and the network device, the data to be transmitted that undergoes the integrity protection. In this way, when the control plane signaling related to the UE that camps on the RN is transmitted between the RN and the Donor base station, integrity protection is provided for the control plane signaling, and therefore attacks such as the denial of a service attack are prevented.

Persons of ordinary skill in the art understand that all or part of the steps of the method embodiments may be implemented by a program instructing relevant hardware. The program may be stored in a computer readable storage medium. When the program runs, the steps of the method embodiments are performed. The foregoing storage medium may be any medium capable of storing program codes, such as a ROM, a RAM, a magnetic disk, or a CD-ROM.

Figure 9:
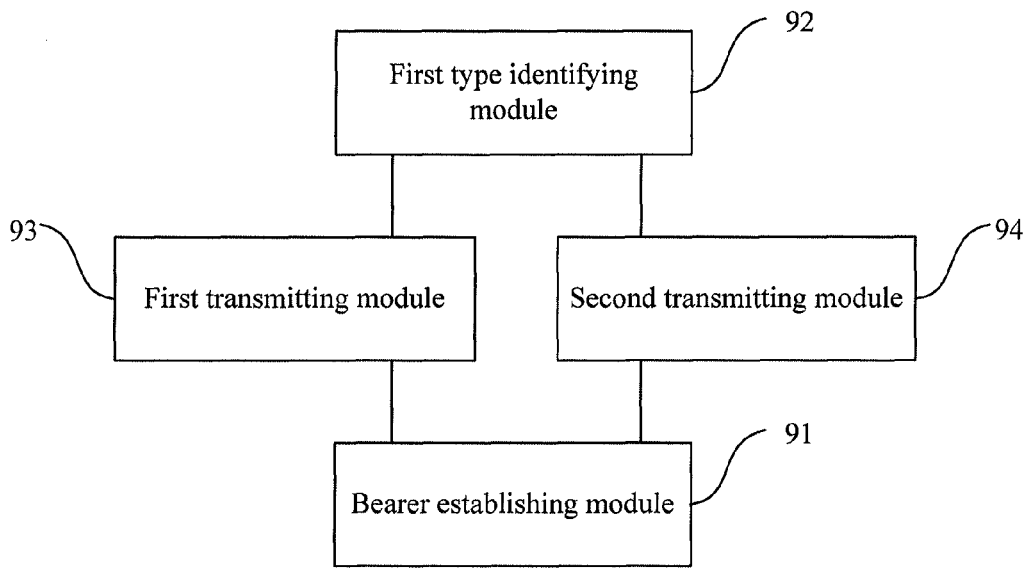
FIG. 9 is a schematic structural diagram of an embodiment of an RN according to the present invention.

FIG. 9 is a schematic structural diagram of an embodiment of an RN according to the present invention. The RN provided in this embodiment can implement the procedure of the embodiment shown in FIG. 2 or FIG. 5. As shown in FIG. 9, the RN may include a bearer establishing module 91, a first type identifying module 92, and a first transmitting module 93.

The bearer establishing module 91 is configured to establish a first user data bearer between the RN and a Donor base station.

The first type identifying module 92 is configured to determine a data type of uplink data to be transmitted.

The first transmitting module 93 is configured to transmit the uplink data to the Donor base station through the first user data bearer established by the bearer establishing module 91 when the first type identifying module 92 determines that the data type of the uplink data to be transmitted is control plane signaling related to a UE that camps on the RN, where the first user data bearer provides both integrity protection and cipher protection for the uplink data to be transmitted.

In this embodiment, the bearer establishing module 91 is further configured to establish a second user data bearer between the RN and the Donor base station.

The RN may further include a second transmitting module 94 configured to transmit the uplink data to the Donor base station through the second user data bearer established by the bearer establishing module 91 when the first type identifying module 92 determines that the data type of the uplink data to be transmitted is user plane data related to the UE that camps on the RN, where the second user data bearer provides cipher protection for the uplink data to be transmitted.

In this embodiment, specifically, the first type identifying module 92 may parse identifier bit(s) in the packet header of the uplink data to be transmitted, and determine, according to the value of the identifier bit(s), the data type of the uplink data to be transmitted, where the identifier bit(s) may include one or any combination of the following: a Protocol/next header field, a source IP address, a destination IP address, a TEID, and a PDCP header C/U indication.

Specifically, the bearer establishing module 91 may establish a first user data bearer on a radio interface between the RN and the Donor base station in a process of accessing the Donor base station by the RN or after there is a UE that camps on the RN.

Specifically, the bearer establishing module 91 may establish a second user data bearer on a radio interface between the RN and the Donor base station in a process of accessing the Donor base station by the RN or after there is a UE that camps on the RN.

In an implementation of this embodiment, after the first type identifying module 92 determines that the data to be transmitted is the control plane signaling related to the UE that camps on the RN, the RN may first obtain a control indication set for the first user data bearer; the first transmitting module 93 transmits, according to the control indication, the uplink data to be transmitted to the Donor base station through the first user data bearer established between the RN and the Donor base station. Specifically, the first transmitting module 93 may set, according to the control indication, the attribute of a PDCP peer layer of the RN to activate integrity protection or the uplink data to be transmitted being the control plane signaling related to the UE that camps on the RN, and transmit, according to the set attribute of the PDCP peer layer, the uplink data to be transmitted to the Donor base station through the first user data bearer established between the RN and the Donor base station.

In another implementation of this embodiment, before the first transmitting module 93 transmits the uplink data to be transmitted to the Donor base station through the first user data bearer established between the RN and the Donor base station, the RN may carry a control indication in the uplink data, where the control indication is used to indicate that integrity protection is provided for the uplink data to be transmitted, so that the Donor base station may perform integrity detection on the received uplink data according to the control indication.

In the above embodiment, when the first type identifying module 92 determines that the data type of the uplink data to be transmitted is the control plane signaling related to the UE that camps on the RN, the first transmitting module 93 transmits the uplink data to be transmitted to the Donor base station through the first user data bearer established by the bearer establishing module 91, where the first user data bearer provides integrity protection for the uplink data to be transmitted. In this way, when the control plane signaling related to the UE that camps on the RN is transmitted between the RN and the Donor base station, integrity protection is provided for the control plane signaling, and therefore attacks such as the denial of a service attack are prevented.

Figure 10:
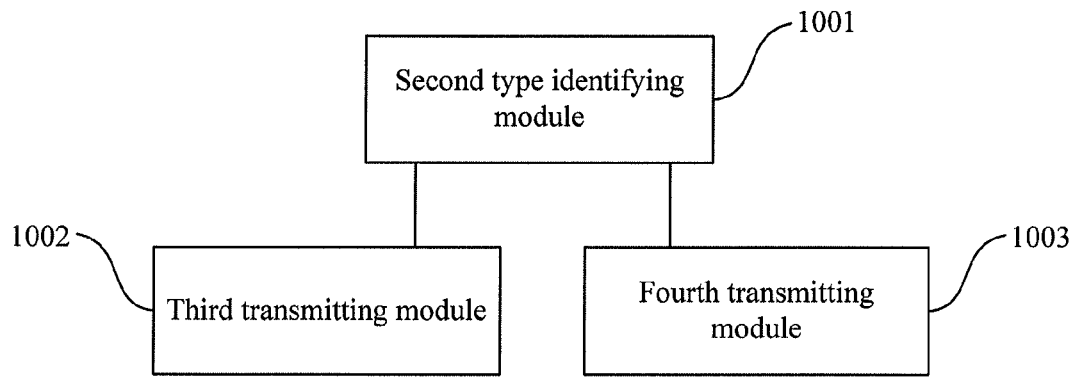
FIG. 10 is a schematic structural diagram of an embodiment of an evolved packet core network node according to the present invention.

FIG. 10 is a schematic structural diagram of an embodiment of an evolved packet core network node according to the present invention. The evolved packet core network node provided in this embodiment may implement the procedure of the embodiment shown in FIG. 4. As shown in FIG. 10, the evolved packet core network node may include a second type identifying module 1001 and a third transmitting module 1002.

The second type identifying module 1001 is configured to determine the data type of downlink data to be transmitted.

The third transmitting module 1002 is configured to transmit the downlink data to be transmitted to the Donor base station through a first transmission bearer between the Donor base station and the evolved packet core network node when the second type identifying module 1001 determines that the data type of the downlink data to be transmitted is the control plane signaling related to a UE that camps on the RN, so that the Donor base station transmits the downlink data to be transmitted to the RN through a first user data bearer that corresponds to the first transmission bearer and is established between the Donor base station and the RN, where the first user data bearer provides integrity protection and cipher protection for the downlink data to be transmitted.

The evolved packet core network node provided in this embodiment may further include:

a fourth transmitting module 1003, configured to transmit the downlink data to be transmitted to the Donor base station through a second transmission bearer between the Donor base station and the evolved packet core network node when the second type identifying module 1001 determines that the data type of the downlink data to be transmitted is the user plane data related to a UE that camps on the RN, so that the Donor base station transmits the downlink data to be transmitted to the RN through a second user data bearer that corresponds to the second transmission bearer and is established between the Donor base station and the RN, where the second user data bearer provides cipher protection for the downlink data to be transmitted.

In this embodiment, specifically, the second type identifying module 1001 may parse identifier bit(s) in the packet header of the downlink data to be transmitted, and determine, according to the value of the identifier bit(s), the data type of the downlink data to be transmitted, where the identifier bit(s) may include one or any combination of the following: a Protocol/next header field, a source IP address, a destination IP address, a TEID, and a PDCP header C/U indication.

In this embodiment, the evolved packet core network node may be a PGW/SGW of the RN.

In the above embodiment, when the second type identifying module 1001 determines that the data type of the downlink data to be transmitted is the control plane signaling related to the UE that camps on the RN, the third transmitting module 1002 transmits the downlink data to be transmitted to the Donor base station through the first transmission bearer; the Donor base station transmits the downlink data to be transmitted to the RN through a first user data transmission bearer corresponding to the first transmission bearer, where the first user data transmission provides, between the RN and the Donor base station, integrity protection for the downlink data to be transmitted. In this way, when the control plane signaling related to the UE that camps on the RN is transmitted between the RN and the Donor base station and between the Donor base station and the evolved packet core network node of the RN, integrity protection is provided for the control plane signaling, and therefore attacks such as the denial of a service attack are prevented.

Figure 11:
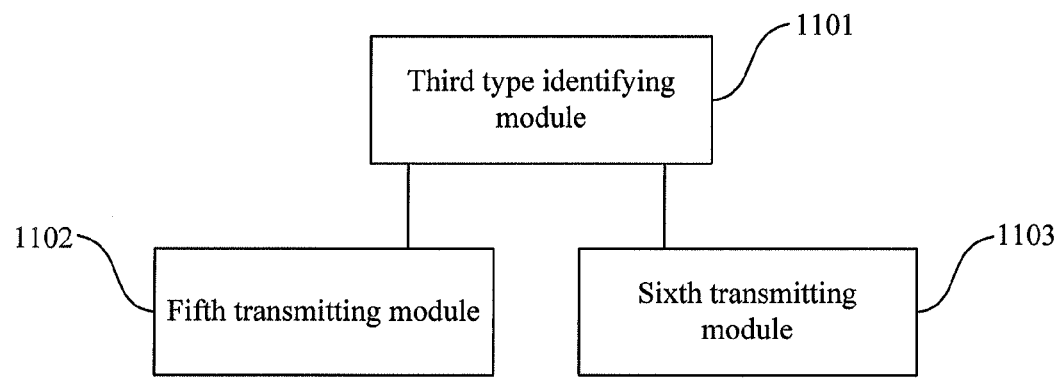
FIG. 11 is a schematic structural diagram of an embodiment of a Donor base station according to the present invention.

FIG. 11 is a schematic structural diagram of an embodiment of a Donor base station according to the present invention. The Donor base station provided in this embodiment may implement the procedure of the embodiment shown in FIG. 7. As shown in FIG. 11, the Donor base station may include a third type identifying module 1101 and a fifth transmitting module 1102.

The third type identifying module 1101 is configured to determine the data type of downlink data to be transmitted.

The fifth transmitting module 1102 is configured to transmit the downlink data to be transmitted to the RN through a first user data bearer established between the RN and the Donor base station when the third type identifying module 1101 determines that the data type of the downlink data to be transmitted is control plane signaling related to a UE that camps on the RN, where the first user data bearer provides integrity protection and cipher protection for the downlink data to be transmitted.

In this embodiment, the Donor base station may further include a six transmitting module 1103 configured to transmit the downlink data to be transmitted to the RN through a second user data bearer established between the RN and the Donor base station when the third type identifying module 1101 determines that the data type of the downlink data to be transmitted is user plane data related to the UE that camps on the RN, where the second user data bearer provides cipher protection for the downlink data to be transmitted.

In this embodiment, specifically, the third type identifying module 1101 may parse identifier bit(s) in the packet header of the downlink data to be transmitted, and determine, according to the value of the identifier bit(s), the data type of the downlink data to be transmitted, where the identifier bit(s) may include one or any combination of the following: a Protocol/next header field, a source IP address, a destination IP address, a TEID, and a PDCP header C/U indication.

In an implementation of this embodiment, after the third type identifying module 1101 determines that the data to be transmitted is control plane signaling related to the UE that camps on the RN, the Donor base station may first obtain a control indication set for the first user data bearer; the fifth transmitting module 1102 may transmit, according to the control indication, the downlink data to be transmitted to the RN through the first user data bearer established between the RN and the Donor base station. Specifically, the fifth transmitting module 1102 may set, according to the control indication, the attribute of a PDCP peer layer of the Donor base station to activate integrity protection or the downlink data to be transmitted being the control plane signaling related to the UE that camps on the RN, and transmit, according to the set attribute of the PDCP peer layer, the downlink data to be transmitted to the RN through the first user data bearer established between the RN and the Donor base station.

In another implementation of this embodiment, before the fifth transmitting module 1102 transmits the downlink data to be transmitted to the RN through the first user data bearer established between the RN and the Donor base station, the Donor base station may carry a control indication in the downlink data to be transmitted, where the control indication is used to indicate that integrity protection is provided for the downlink data to be transmitted, so that the RN may perform integrity detection on the received downlink data according to the control indication.

In the above embodiment, when the third type identifying module 1101 determines that the data type of the downlink data to be transmitted is the control plane signaling related to the UE that camps on the RN, the fifth transmitting module 1102 transmits the downlink data to the Donor base station through the first user data bearer, where the first user data bearer provides, between the RN and the Donor base station, integrity protection for the downlink data to be transmitted. In this way, when the control plane signaling related to the UE that camps on the RN is transmitted between the RN and the Donor base station, integrity protection is provided for the control plane signaling, and therefore attacks such as the denial of a service attack are prevented.

Figure 12:
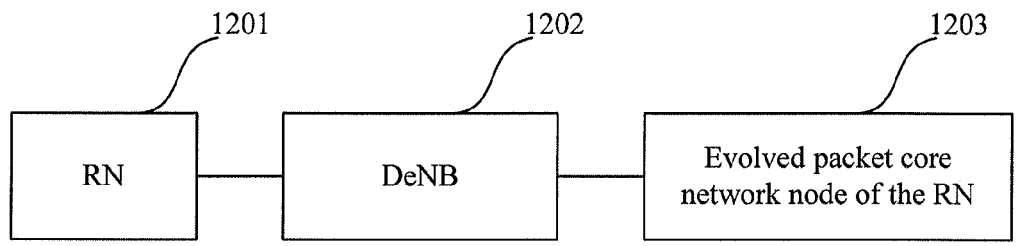
FIG. 12 is a schematic structural diagram of an embodiment of a system for data transmission according to the present invention.

FIG. 12 is a schematic structural diagram of an embodiment of a system for data transmission according to the present invention. As shown in FIG. 12, the system for data transmission in this embodiment may include an RN 1201, a Donor base station 1202, and an evolved packet core network node 1203 of an RN. In the system for data transmission, the process of transmitting uplink data is shown in FIG. 2, and the process of transmitting downlink data is shown in FIG. 4. These processes are not further described.

Specifically, the RN 1201 may be implemented by the RN of the embodiment shown in FIG. 9. The Donor base station 1202 may be an existing Donor base station. The evolved packet core network node 1203 of the RN may be implemented by the evolved packet core network node of the embodiment shown in FIG. 10.

By using the above system for data transmission, when the control plane signaling related to the UE that camps on the RN is transmitted between the RN and the Donor base station, integrity protection is provided for the control plane signaling, and therefore attacks such as the denial of a service attack are prevented.

Figure 13:
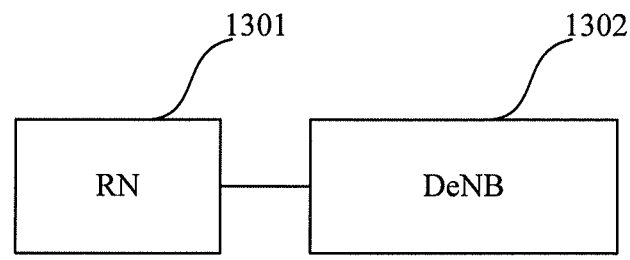
FIG. 13 is a schematic structural diagram of another embodiment of a system for data transmission according to the present invention.

FIG. 13 is a schematic structural diagram of another embodiment of a system for data transmission according to the present invention. As shown in FIG. 13, the system for data transmission in this embodiment may include an RN 1301 and a Donor base station 1302. In the system for data transmission, the process of transmitting uplink data is shown in FIG. 5, and the process of transmitting downlink data is shown in FIG. 7. These processes are not further described.

Specifically, the RN 1301 may be implemented by the RN of the embodiment shown in FIG. 9; the Donor base station 1302 may be implemented by the Donor base station of the embodiment shown in FIG. 11.

By using the above system for data transmission, when the control plane signaling related to the UE that camps on the RN is transmitted between the RN and the Donor base station, integrity protection is provided for the control plane signaling, and therefore attacks such as the denial of a service attack are prevented.

Figure 14:
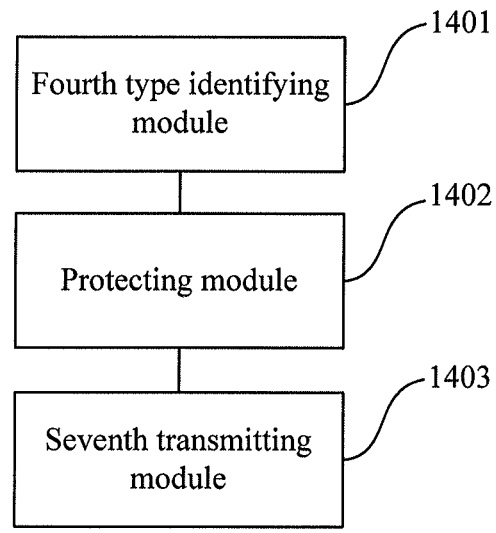
FIG. 14 is a schematic structural diagram of an embodiment of an apparatus for data transmission according to the present invention.

FIG. 14 is a schematic structural diagram of an embodiment of an apparatus for data transmission according to the present invention. The apparatus for data transmission in this embodiment may be an RN or a network device, which can implement the procedure shown in FIG. 8. The network device includes a Donor base station or an evolved packet core network node of the RN. The evolved packet core network node of the RN may be a PGW/SGW of the RN.

As shown in FIG. 14, the apparatus for data transmission may include a fourth type identifying module 1401, a protecting module 1402, and a seventh transmitting module 1403.

The fourth type identifying module 1401 is configured to determine the data type of data to be transmitted. The protecting module 1402 is configured to perform integrity protection on the data to be transmitted through an IPsec association between the RN and the network device when the fourth type identifying module 1401 determines that the data type of the data to be transmitted is control plane signaling related to the UE that camps on the RN.

The seventh transmitting module 1403 is configured to transmit, through a user data bearer between the RN and the network device, the data to be transmitted that undergoes the integrity protection performed by the protecting module 1402.

In this embodiment, specifically, the fourth type identifying module 1401 may parse identifier bit(s) in the packet header of the data to be transmitted, and determine, according to the value of the identifier bit(s), the data type of the data to be transmitted, where the identifier bit(s) may include one or any combination of the following: a Protocol/next header field, a source IP address, a destination IP address, a TEID, and a PDCP header C/U indication.

In the above embodiment, when the fourth type identifying module 1401 determines that the data type of the data to be transmitted is control plane signaling related to the UE that camps on the RN, the protecting module 1402 first performs integrity protection on the data to be transmitted, and then the seventh transmitting module 1403 transmits, through a user data bearer between the RN and the network device, the data to be transmitted that undergoes the integrity protection performed by the protecting module 1402. In this way, when the control plane signaling related to the UE that camps on the RN is transmitted between the RN and the Donor base station, integrity protection is provided for the control plane signaling, and therefore attacks such as the denial of a service attack are prevented.

Those skilled in the art understand that the accompanying drawings are merely schematic diagrams of embodiments, and that modules or procedures in the accompanying drawings are not mandatory in implementing the present invention.

Those skilled in the art understand the modules of the apparatuses in the embodiments may be disposed in the apparatuses as described in the embodiments or disposed in one or more apparatuses other than the apparatuses in the embodiments. The modules in the embodiments may be combined into one, or split into several submodules.

Finally, it should be noted that the above embodiments are used only to describe the technical solution of the present invention instead of limiting the present invention. Although the present invention is described in detail with reference to the exemplary embodiments, persons of ordinary skill in the art should understand that they can still make modifications or equivalent substitutions to the technical solution of the present invention without departing from the spirit and protection scope of the technical solution of the present invention.

What is claimed is:

1. A method for data transmission, comprising:
   determining by a relay node, that data to be transmitted is control plane signaling related to a user equipment that camps on the relay node, wherein the control plane signaling related to the user equipment that camps on the relay node includes S1 interface signaling;
   setting, by the relay node, based on an obtained control indication of a first user data bearer established between the relay node and a donor base station, an attribute of a Packet Data Convergence Protocol (PDCP) peer layer of a dedicated Data Radio Bearer (DRB) in a relay link to activate integrity protection; and
   transmitting, by the relay node, based on the set attribute of the PDCP peer layer, the data to be transmitted through the first user data bearer to the donor base station, wherein the data to be transmitted through the first user data bearer is integrity-protected, and a user plane protocol is applied to the first data bearer.

2. The method according to claim 1, wherein before the transmitting the data to be transmitted through the first user data bearer, the method further comprises:
   in a process of accessing the donor base station by the relay node, or after there is a user equipment that camps on the relay node, establishing the first user data bearer on a radio interface between the relay node and the donor base station.

3. The method according to claim 1, wherein the data to be transmitted is uplink data to be transmitted on the relay node, and the determining that the data to be transmitted is the control plane signaling related to the user equipment that camps on the relay node comprises:

determining, by the relay node, that the uplink data is the control plane signaling related to the user equipment that camps on the relay node;

the transmitting the data to be transmitted through the first user data bearer comprises: transmitting, by the relay node, the uplink data to the donor base station through the first user data bearer.

4. The method according to claim 1, wherein the data is uplink data to be transmitted on the relay node, and the determining that the data to be transmitted is the control plane signaling related to the user equipment that camps on the relay node comprises:

determining, by the relay node, that the uplink data is the control plane signaling related to the user equipment that camps on the relay node;

the transmitting the data to be transmitted through the first user data bearer comprises: transmitting, by the relay node, the uplink data to the donor base station through the first user data bearer.

5. The method according to claim 1, wherein after the determining that the data to be transmitted is the control plane signaling related to the user equipment that camps on the relay node, the method further comprises:

obtaining, by the relay node, the control indication set for the first user data bearer.

6. The method according to claim 1, wherein the determining that the data to be transmitted is the control plane signaling related to the user equipment that camps on the relay node comprises:

parsing, by the relay node, identifier bit(s) in a packet header of the data to be transmitted, and determining, by the relay node, based on a value of the identifier bit(s), that the data to be transmitted is the control plane signaling related to the user equipment that camps on the relay node, wherein the identifier bit(s) comprise one or any combination of the following: a protocol/next packet header, a source Internet Protocol (IP) address, a destination IP address, a tunnel endpoint identifier, and a PDCP header control plane/user plane indication.

7. The method according to claim 1, wherein before the transmitting the data to be transmitted through the first user data bearer, the method further comprises:

carrying, by the relay node, a control indication in the data, wherein the control indication is used to indicate that integrity protection is provided for the data.

8. A relay node, communicating with a donor base station, comprising:

a bearer establishing module configured to establish a first user data bearer between the relay node and the donor base station;

a first type identifying module configured to determine a data type of uplink data to be transmitted; and a first transmitting module, configured to set, based on an obtained control indication of the first user data bearer, an attribute of a Packet Data Convergence Protocol (PDCP) peer layer of a dedicated DRB in a relay link to activate integrity protection; and transmit, based on the set attribute of the PDCP peer layer, the uplink data to be transmitted to the donor base station through the first user data bearer when the first type identifying module determines that the data type of the uplink data to be transmitted is control plane signaling related to a user equipment that camps on the relay node, wherein the control plane signaling related to the user equipment that camps on the relay node includes S1 interface signaling, the uplink data to be transmitted through the first user data bearer is integrity-protected and a user plane protocol is applied to the first data bearer.

9. The relay node according to claim 8, wherein the bearer establishing module is further configured to establish a second user data bearer between the relay node and the donor base station; and the relay node further comprises:

a second transmitting module, configured to transmit the uplink data to be transmitted to the donor base station through the second user data bearer established by the bearer establishing module when the first type identifying module determines that the data type of the uplink data to be transmitted is user plane data related to the user equipment that camps on the relay node, wherein the second user data bearer provides cipher protection for the uplink data to be transmitted.

10. The relay node according to claim 8, wherein the bearer establishing module is configured to establish the first user data bearer on a radio interface between the relay node and the donor base station in a process of accessing the donor base station by the relay node or after the user equipment camps on the relay node.

11. The relay node according to claim 8, wherein the first type identifying module is configured to parse identifier bit(s) in a packet header of the uplink data to be transmitted, and determine, based on the value of the identifier bit(s), the data type of the uplink data to be transmitted, wherein the identifier bit(s) comprise one or any combination of the following: a protocol/next packet header, a source Internet Protocol (IP) address, a destination IP address, a tunnel endpoint identifier, and a PDCP header control plane/user plane indication.

12. A donor base station communicating with a relay node, comprising:

a type identifying module configured to determine a data type of downlink data to be transmitted; and a transmitting module configured to set, based on an obtained control indication of a first user data bearer established between the relay node and the donor base station, an attribute of a Packet Data Convergence Protocol (PDCP) peer layer of a dedicated DRB in a relay link to activate integrity protection; and transmit, based on the set attribute of the PDCP peer layer, the downlink data to be transmitted to the relay node through the first user data bearer when the type identifying module determines that the data type of the downlink data to be transmitted is control plane signaling related to a user equipment that camps on the relay node, wherein the control plane signaling related to the user equipment that camps on the relay node includes Si interface signaling, the downlink data to be transmitted through the first user data bearer is integrity-protected, and a user plane protocol is applied to the first data bearer.

13. The donor base station according to claim 12, further comprising:

the transmitting module, configured to transmit the downlink data to be transmitted to the relay node through a second user data bearer established between the relay node and the donor base station when the type identifying module determines that the data type of the downlink data to be transmitted is user plane data related to the user equipment that camps on the relay node, wherein the second user data bearer provides cipher protection for the downlink data to be transmitted.

14. The donor base station according to claim 12, wherein the type identifying module is configured to parse identifier bit(s) in a packet header of the downlink data to be transmitted, and determine, based on a value of the identifier bit(s), the data type of the downlink data to be transmitted, wherein the identifier bit(s) comprise one or any combination of the following: a protocol/next packet header, a source Internet Protocol (IP) address, a destination IP address, a tunnel endpoint identifier, and a PDCP header control plane/user plane indication.

* * * * *

UNITED STATES PATENT AND TRADEMARK OFFICE
CERTIFICATE OF CORRECTION

| | | |
|---|---|---|
| PATENT NO. | : 9,232,404 B2 | Page 1 of 1 |
| APPLICATION NO. | : 13/432504 | |
| DATED | : January 5, 2016 | |
| INVENTOR(S) | : Jing Chen et al. | |

It is certified that error appears in the above-identified patent and that said Letters Patent is hereby corrected as shown below:

On the Title Page

Left column, item (75), replace "Aiqing Zhang" with --Aiqin Zhang--.

Signed and Sealed this
Thirty-first Day of May, 2016

Michelle K. Lee
*Director of the United States Patent and Trademark Office*